(12) United States Patent
Roy et al.

(10) Patent No.: US 7,647,449 B1
(45) Date of Patent: Jan. 12, 2010

(54) METHOD, SYSTEM, AND COMPUTER READABLE MEDIUM FOR MAINTAINING THE ORDER OF WRITE-COMMANDS ISSUED TO A DATA STORAGE

(75) Inventors: Subhojit Roy, Pune (IN); Niranjan Sanjiv Pendharkar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 437 days.

(21) Appl. No.: 11/540,822

(22) Filed: Sep. 28, 2006

(51) Int. Cl.
*G06F 12/00* (2006.01)
(52) U.S. Cl. .................................. 711/112
(58) Field of Classification Search .................. None
See application file for complete search history.

(56) References Cited

U.S. PATENT DOCUMENTS 7,380,081 B2 * 5/2008 Ji et al. ...................... 711/162
7,406,487 B1 * 7/2008 Gupta et al. ................. 707/204

OTHER PUBLICATIONS

"Data Replication and Recovery Over Any Distance Ensuring 100% Data Consistency," *Topio* (Jan. 2005), 1-7.

* cited by examiner

*Primary Examiner*—Brian R Peugh
(74) *Attorney, Agent, or Firm*—Moser IP Law Group

(57) ABSTRACT

A method, system, and computer readable medium for maintaining the order of write-commands issued to a data storage, where the write-commands are issued by one or more host. In one embodiment of the present invention the method includes assigning an order-descriptor to each write-command, storing the write-command, storing the order-descriptor, and collating a plurality of order-descriptors and their corresponding write-commands to obtain an ordered write-command stream.

17 Claims, 5 Drawing Sheets

METHOD, SYSTEM, AND COMPUTER READABLE MEDIUM FOR MAINTAINING THE ORDER OF WRITE-COMMANDS ISSUED TO A DATA STORAGE

BACKGROUND OF THE INVENTION

1. Field of the Invention

Embodiments of the present invention generally relate to data storage and, more particularly, to a method, system, and computer program product for maintaining the order of write-commands issued to a data storage.

2. Description of the Related Art

In information sharing and processing environments, many businesses employ data processing systems for storing and processing data. Often, the viability of a business depends on the reliability of access to data storage contained within its data processing system. As such, businesses seek reliable and efficient ways to consistently protect their data processing systems and the data storage contained therein from natural disasters, acts of terrorism, and unauthorized access, or computer hardware and/or software failures. Remote backup systems have been used for the protection of data storage by minimizing or eliminating loss of data, thereby forming an important aspect of business strategy and a key element in information sharing and processing environments. A duplicate of the data volume is prepared by transferring the data (hereinafter referred as replication) written in one information processing system to one remote backup system in a remote location. A technique to asynchronously transfer duplicate data is known as asynchronous replication.

In asynchronous replication, a host computer (host) may request a write operation at a first time; however, the data processing system performs data transfer to the remote backup at a second time that is after returning to a host a response indicating the backup is complete. Hence, write-commands from the host may not be sent to the remote backup until a later time. The downside of this technique is that the possibility of data loss if the data has not been stored onto both the data storage and the remote backup when a fault occurs. When a duster of multiple hosts share the data storage that is asynchronously replicated to the remote backup, co-ordination across the multiple hosts is necessary in order to ensure that the write-commands are applied to the remote backup in the exact same order as they have been applied at the data storage.

One of the ways to ensure order of the write-commands in the remote backup is by assigning a global time-stamp to each write-command issued by one or more hosts of the clustered environment. However, most of the known replication data processing models require complex co-ordination in a parallel clustered environment to assign such a time stamp and generate an ordered stream of write-commands. Such co-ordination across hosts requires network messages be communicated amongst host computers and can degrade performance of clustered applications.

Therefore, there is a need in the art for method, apparatus and computer program product to maintain the order of write-commands issued by one or more hosts of the clustered applications without substantially affecting performance of the clustered applications.

SUMMARY OF THE INVENTION

The present invention provides a method for maintaining the order of write-commands issued to a data storage. The write-commands are issued by at least one host. The method includes assigning an order-descriptor to each write-command, storing the write-command, storing the order-descriptor, and collating a plurality of order-descriptors and their corresponding write-commands to obtain an ordered write-command stream.

The present invention further provides a system for maintaining the order of write-commands issued to a data storage. The system includes a write-order manager to assign an order-descriptor to each write-command, a data log associated with the issuing host to store the write-command, a descriptor log associated to write-order manager to store the order-descriptor, and a collating module to collate a plurality of order-descriptors from the descriptor log and their corresponding write-commands from the respective data logs to obtain an ordered write-command stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention provides a method, system, and computer program product for maintaining the order of write-commands issued to a primary data storage. The write-commands are issued by one or more hosts accessing the primary data storage. Various embodiments of the present invention provide a write-order manager for assigning an order-descriptor to each write-command. Further, each write-command is stored in a data log associated with the host that issued the write-command. In one embodiment of the invention, the write-order manager stores the order-descriptor in a descriptor log associated with write-order manager. Various embodiments of the present invention further provide for collating a plurality of order-descriptors from the descriptor log and their corresponding write-commands from the respective data logs to obtain an ordered write-command stream.

In various embodiments of the present invention, the ordered write-command stream may be used to maintain write order fidelity while updating a backup of the primary data storage. Further, in various embodiments, the ordered write-command stream may be used to "roll back" the state of the data storage in a continuous data protection (CDP) system, where data is continuously written to the backup (secondary) storage with respect to every write to the primary storage.

Figure 1:
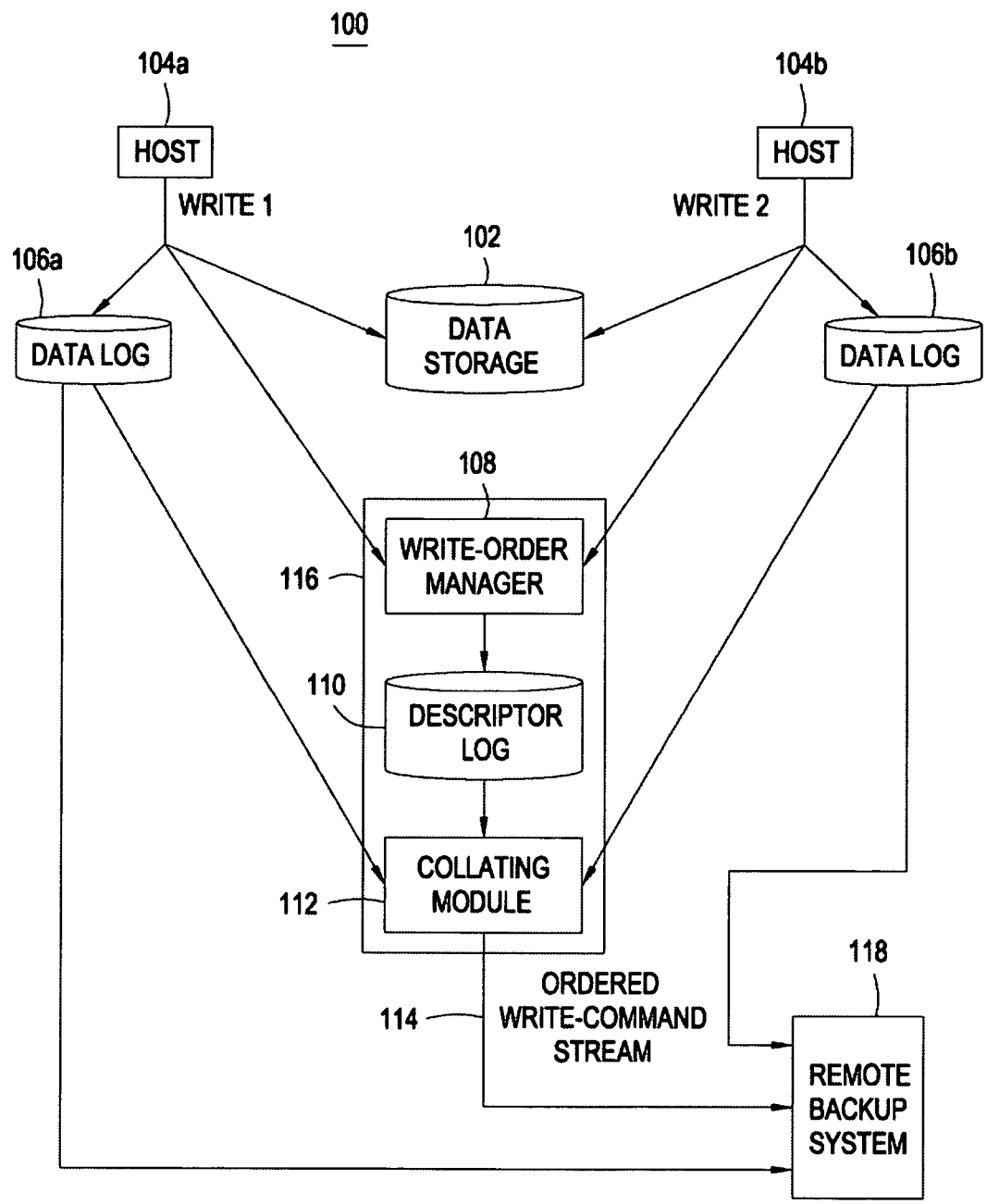
FIG. 1 is a block diagram of a system for maintaining the order of write-commands issued to a data storage, according to an exemplary embodiment of the present invention.

FIG. 1 is a block diagram of a data storage system 100 for maintaining the order of write-commands issued to a primary data storage 102, according to an exemplary embodiment of the present invention. Data storage 102 is a logical unit of storage and may be formed by a portion of the overall storage of a physical device, by the storage of an entire physical device or by the storage of multiple physical devices combined together.

The system 100 comprises a plurality of host computers (e.g., hosts 104a and 104b) coupled to the primary data storage 102. Further, data logs 106a and 106b are coupled to hosts 104a and 104b, respectively. Hosts 104 may issue write-commands to the primary data storage 102 to facilitate data storage. To control a backup or data replication process using remote backup system 118. The system 100 comprises a virtualization appliance 116. This appliance 116 comprises a write-order manager 108, a descriptor log 110, and a collating module 112. Although the collating module 112 is shown and described as being a component of the appliance 116, the collating module 112 does not require to be collocated with the descriptor log 110. As such, the collating module 112 may be a standalone service or located within the remote backup system 118.

In operation, host 104a issues a write-command WRITE1 to the primary data storage 102 and to write-order manager 108 synchronously. Further, host 104a stores write-command WRITE1 in data log 106a. In response, write-order manager 108 assigns an order-descriptor for write-command WRITE1. The order-descriptor for write-command WRITE1 includes an indicia of order representing the order in which write-command WRITE1, among other write-commands, is issued to data storage 102. The order-descriptor for write-command WRITE1 further includes metadata information of write-command WRITE1. Write-order manager 108 may optionally send an acknowledgement (not shown in figure) to host 104a upon assignment of the order-descriptor.

Write-command manager 108 further stores each order-descriptor assigned to the write-commands in descriptor log 110. Similarly, write-command WRITE2 is issued by host 104b, and stored in data log 106b, and an order-descriptor corresponding to WRITE2 is stored in descriptor log 110. The figure shows two hosts writing to data storage 102 in order to illustrate embodiments of the present invention with the help of an example, and not to limit the scope of the present invention. Descriptor log 110 thereby logs order-descriptors corresponding to each write-command issued to data storage 102 by a host. Therefore, descriptor log 110 functions as a write order indicator of a CDP system for data storage 102. In an embodiment of the present invention descriptor log 110 may be append only log.

Further, in an embodiment, appliance 116 maintains write order fidelity while updating a remote backup system 118 (e.g., secondary storage) to replicate the data storage 102. In order to do this, collating module 112 reads a plurality of the order-descriptors from the descriptor log. The order-descriptors include indicia of orders representing the order of the write-commands issued to data storage 102. Further, the metadata information in each order-descriptor is used to retrieve the corresponding write-command from the data log 106. Collating module 112 to obtain an ordered write-command stream 114. In one embodiment of the invention, the collating module 112 is a part of appliance 116.

Specifically, the collating module 112 reads each entry from the descriptor log. For each such entry, module 112 determines which host the write-entry belongs to (the description entry contains host id, along with details of the write, such as offset, length, target volume). Once module 112 knows which host the entry belongs to, module 112 reads the corresponding entry from the data log of that host. To find the corresponding entry, the module 112 searches the entry in the data log that corresponds to details of the write. Alternately, the location of the write may be contained in the data log of that host, in the description that is sent to the appliance 116. After the descriptor log entry and the corresponding data log entry are retrieved, they are collated and sent to the remote host. (Alternately, CDP related processing can be performed using the collated information). Lastly, the entries that are retrieved from log are marked as such.

The above steps are repeated for each entry in descriptor log, in an ordered fashion. The generation number (or time stamp) in the descriptor log entry provides the order of writes to be applied on the remote backup system 118.

In one embodiment of the invention, ordered write-command stream 114 of the write-commands is used to update the backup of data storage 102. The backup storage 118 may be present in a remote location to asynchronously store copies of the data on the data storage 102. The embodiment uses ordered write-command stream 114 to transmit the write-commands to the remote storage in the same order as it was reflected in data storage 102. The write data contained in the data logs 106a and 106b is also provided to the remote backup system 118.

In one embodiment of the invention ordered write-command stream 114 is used to "roll back" the data storage to any point in time Since the stream 114 comprises all the write-commands in the order they were performed by all hosts, the ordered write-command stream 114 may be used to restore primary data storage 102 to any point in time.

Alternatively, the invention finds use in block level CDP. Block level CDP typically stores all updates to the primary data storage, along with the order in which they occurred, in a secondary storage. Using this data, a CDP store can provide a point in time image of the data at any past time. This point in time image can be used to restore the primary storage, should there be a need. One example of block level CDP involves a time indexed storage (e.g. temporal volume). When data is written on such a storage, the storage system indexes the data with respect to time (without deleting any old data). In this manner, the system can efficiently provide an image of the data volume at any point in time in the past. The collated data obtained using embodiments of the present invention can be replayed on such a time index storage to provide the time indexing for the CDP solution.

The connections between elements such as data storage 102, write-order manager 114, data logs 106 may comprise, without limitation, Ethernet, Small Computer System Interface (SCSI) cable, fiber optic lines, telephone lines, wireless communication lines and the like.

The hosts 104, write-order manager 108, and collating module 110 are data processing devices. Those skilled in the art will appreciate that various forms of data processing devices may be employed in various embodiments the present invention including, without limitation, personal computers, servers, mainframes, and the like. An exemplary embodiment of the data processing device is described in detail with reference to FIG. 7 below.

Figure 2:
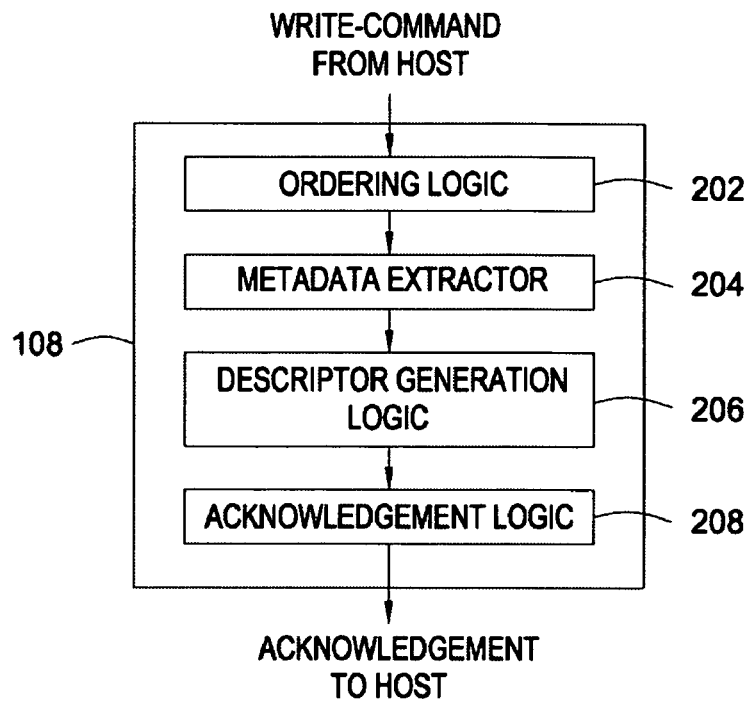
FIG. 2 is a block diagram of a write-order manager, according to an exemplary embodiment of the present invention.

FIG. 2 is a block diagram of write-order manager 108, according to an exemplary embodiment of the present invention. The write-order manager 108 comprises an ordering logic 202 that assigns an indicia of order to write-commands received by it. The indicia of order may include a time-stamp for the write-command. In another embodiment, the indicia of order may include a monotonically increasing number. It would be apparent to one skilled in the art that various schemes for capturing order information for the write-command may be employed without deviating from the spirit and scope of the present invention. Write-order manager 108 also includes a metadata extractor 204 to extract the metadata information from the write-command. In the embodiment depicted in the figure, write-order manager 108 includes metadata extractor 204. In another embodiment, write-order manager 108 receives the metadata information directly from the host. While various embodiments have been described wherein write-order manager 108 receives write-commands from hosts 104, it will be apparent to one skilled in the art that the teachings of the present invention may be employed even if hosts 104 send only the metadata information for write-commands to write-order manager 108.

The metadata information may include, without limitation, the initiator of the write-command, the target volume of the write-command, the start-offset for the write-command (e.g., a host ID), and the length of the write-command. Additionally, the metadata information includes a location (offset) of the data corresponding to this description entry in the corresponding data log. Knowing this offset assists in the collation process that is described above.

Write-order manager 108 further includes a descriptor generation logic 206 to construct the order-descriptor using the indicia of order and a metadata information for the write-command. Further, write-order manager 108 may optionally include an acknowledgement logic 206 to send an acknowledgement message to the host that issued the write-command. The acknowledgement message may be used to indicate the host that the assignment of an order-descriptor for the write-command is complete. Those skilled in the art will understand that write-order manager 108 may be any data processing device that interprets, rejects, or satisfies, and replies to requests received from a source.

Figure 3:
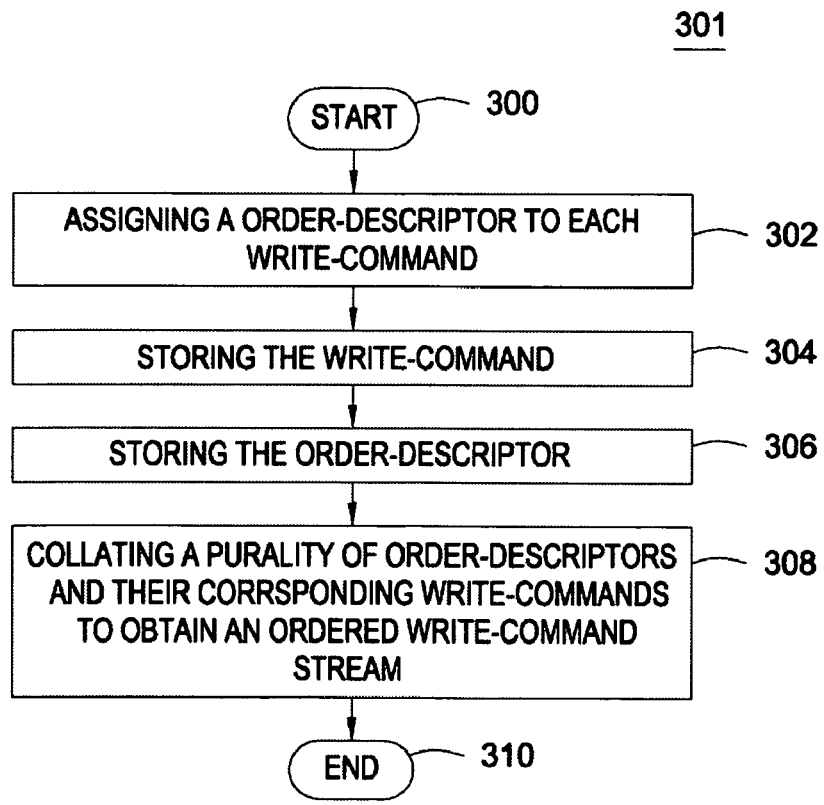
FIG. 3 is a flowchart of a method for maintaining the order of write-commands issued to the data storage, wherein the write-commands are issued by a plurality of host computers, according to an exemplary embodiment of the present invention.

FIG. 3 is a flowchart of a method 301 for maintaining the order of write-commands issued to the data storage, wherein the write-commands are issued by the one or more host, according to an exemplary embodiment of the present invention. The method 301 starts at block 300 and proceeds to block 302, wherein system 100 assigns an order-descriptor to each write-command. At block 304, the issuing host stores the write-command. Then, at block 306, system 100 stores the order-descriptor in descriptor log 110. At block 308, system 100 collates a plurality of order-descriptors and their corresponding write-commands to obtain an ordered write-command stream. The step of collating is described further with reference to FIG. 6. The method stops at block 310.

Figure 4:
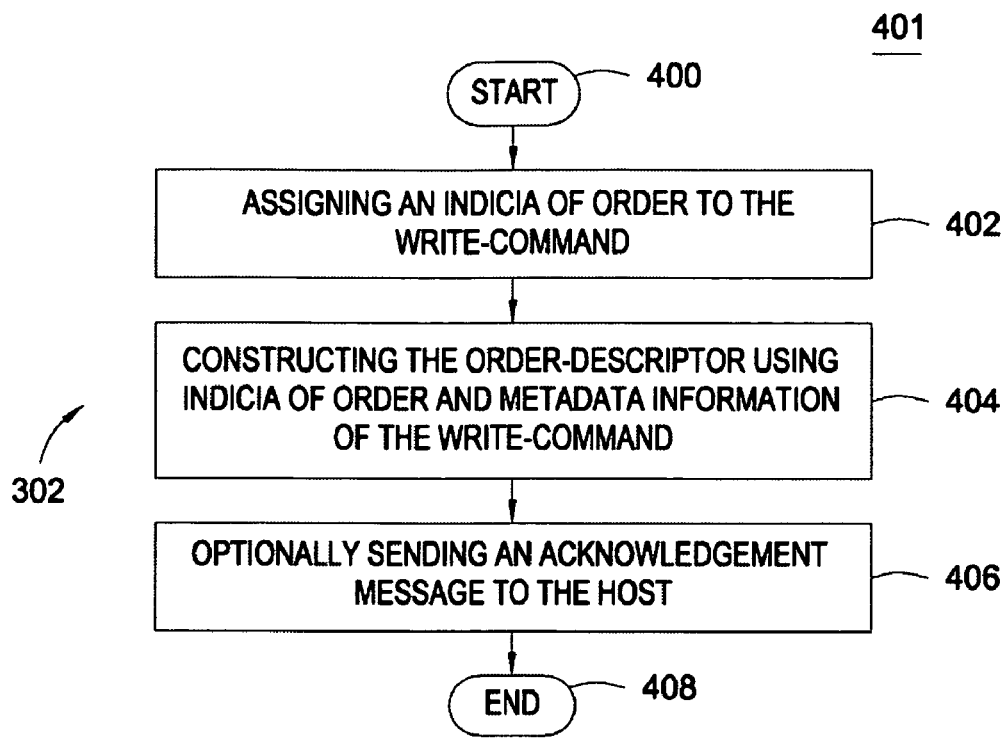
FIG. 4 is a flowchart of a method of assigning the order-descriptor to the write-command, according to an exemplary embodiment of the present invention.

FIG. 4 is a flowchart of a method 401 of assigning the order-descriptor to the write-command, according to an exemplary embodiment of the present invention. The method 401 starts at block 400 and proceeds to block 402, wherein write-order manager 108 assigns an indicia of order to the write-command. The indicia of order represents the order of the write-command among all write-commands issued by hosts 104. The indicia of order may include without limitation, a time-stamp and/or a monotonically increasing number. At block 404, write-order manager 108 constructs the order-descriptor using the indicia of order and metadata information. At block 406, write-order manager 108 may return an acknowledgement message to the host. The acknowledgement message may be used to indicate to the host that the assignment of the order-descriptor is complete. The method stops at block 408.

Figure 5A:
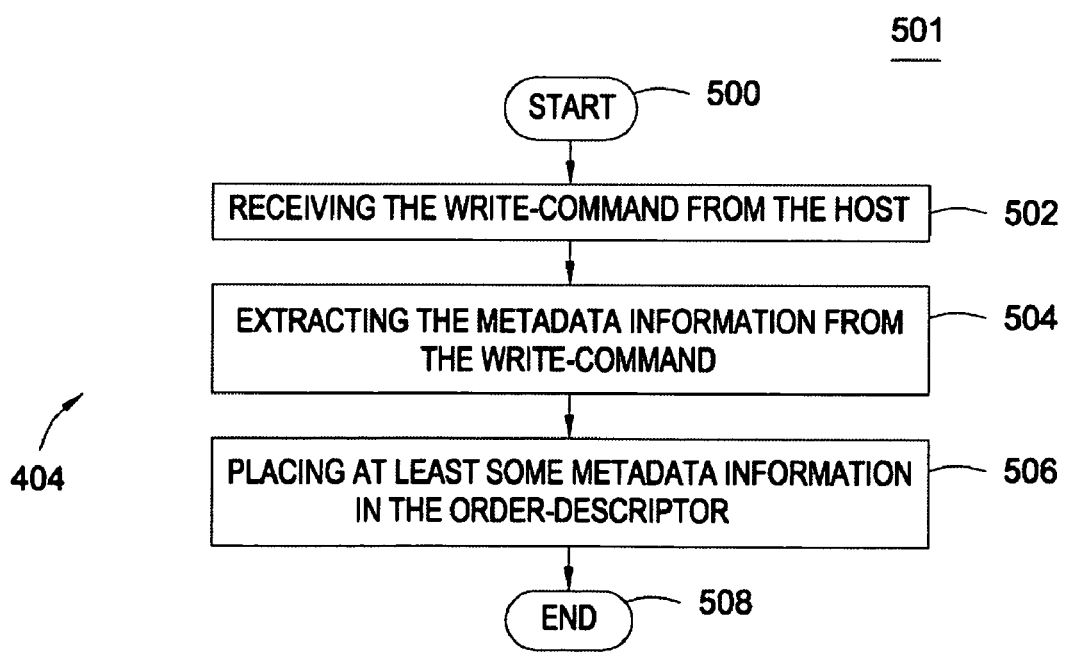
FIG. 5A is a flowchart of a method of constructing the order-descriptor for a write-command, according to an exemplary embodiment of the present invention.

FIG. 5A is a flowchart of a method 501 of constructing the order-descriptor for a write-command, according to an exemplary embodiment of the present invention. The method 501 starts at block 500 and proceeds to block 502, wherein the write-order manager receives the write-command from a host. The host issues the write-command to write-order manager 108 and data storage 102 synchronously. Next, the write-order manager 108 extracts metadata information from the write-command, at block 504. At block 506, write-order manager 108 places at least some metadata information in to the order-descriptor. The method ends at block 508.

Figure 5B:
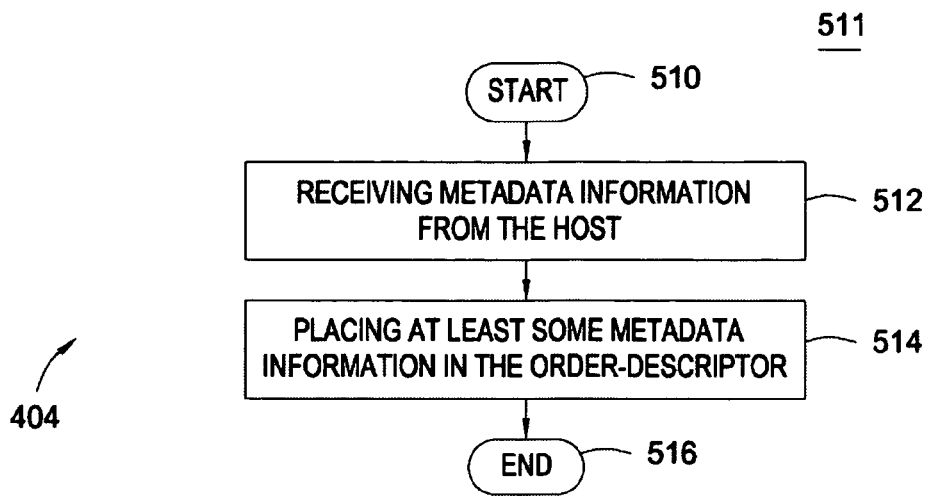
FIG. 5B is a flowchart of a method of constructing the order-descriptor for a write-command, according to another exemplary embodiment of the present invention.

FIG. 5B is a flowchart of a method 511 of constructing the order-descriptor for a write-command, according to another exemplary embodiment of the present invention. In this embodiment, hosts 104 are aware of the metadata information required by write-order manager 108 in order to construct the order-descriptor. The method 511 starts at block 510 and proceeds to block 512, wherein write-order manager 108 receives the metadata information from the host that issued the write-command. At block 514, write-order manager 108 places at least some metadata information in to the order-descriptor. The method ends at block 516.

Figure 6:
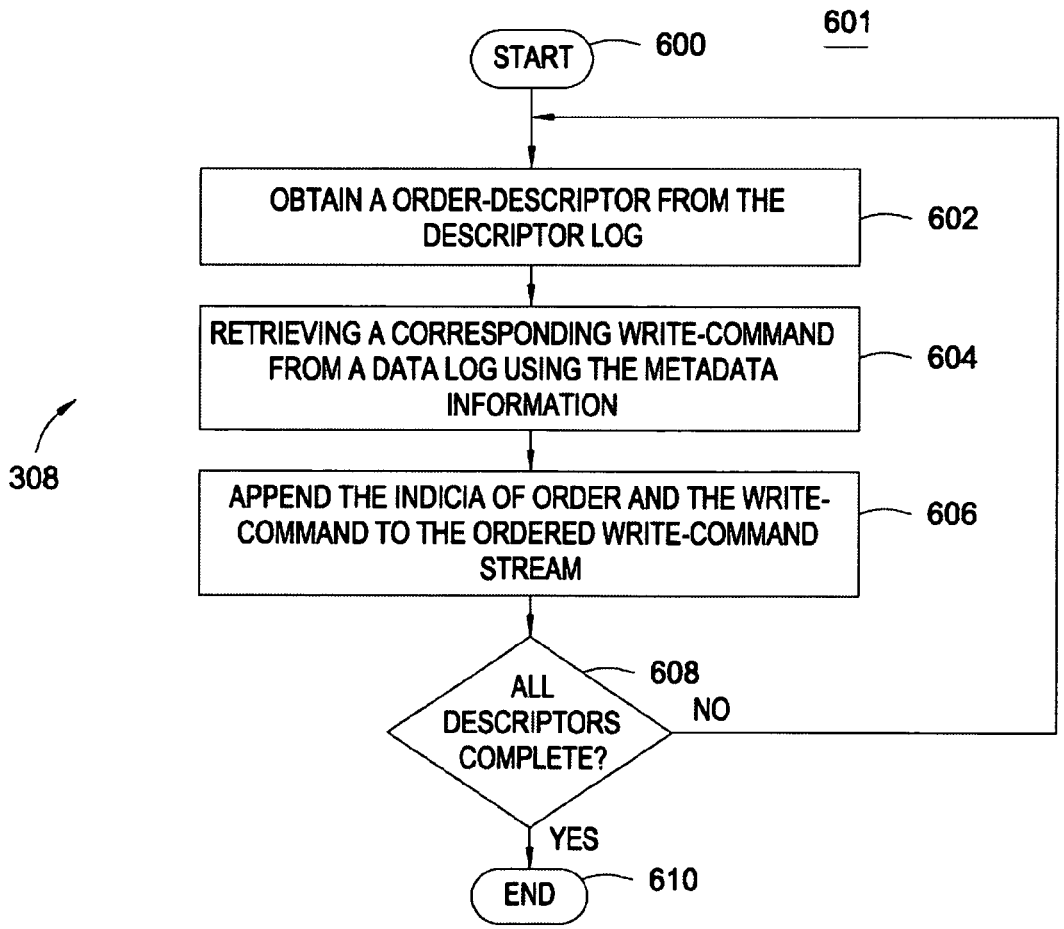
FIG. 6 is a flowchart of a method of collating a plurality of order-descriptors and their corresponding write-commands, according to an exemplary embodiment of the present invention.

FIG. 6 is a flowchart of a method 601 of collating a plurality of order-descriptors and their corresponding write-commands, according to an exemplary embodiment of the present invention. The method 601 starts at block 600 and proceeds to block 602, wherein collating module 112 obtains an order-descriptor from the descriptor log. These descriptors contain the host identification for the host that issued the write command. Then, at block 604, collating module 112 retrieves the write-command corresponding to the order-descriptor from the respective data log of the identified host. In an embodiment, the data log to retrieve write-command from may be identified using the metadata information stored in the order-descriptor. At block 606, collating module 112 appends the indicia of order and the corresponding write-command to the ordered write-command stream. At step 608, the method 601 queries whether all the descriptors are complete. If the query is negatively answered, the method 601 proceeds to step 602 to obtain another order descriptor. If the query is affirmatively answered, the method 601 stops at block 610.

Figure 7:
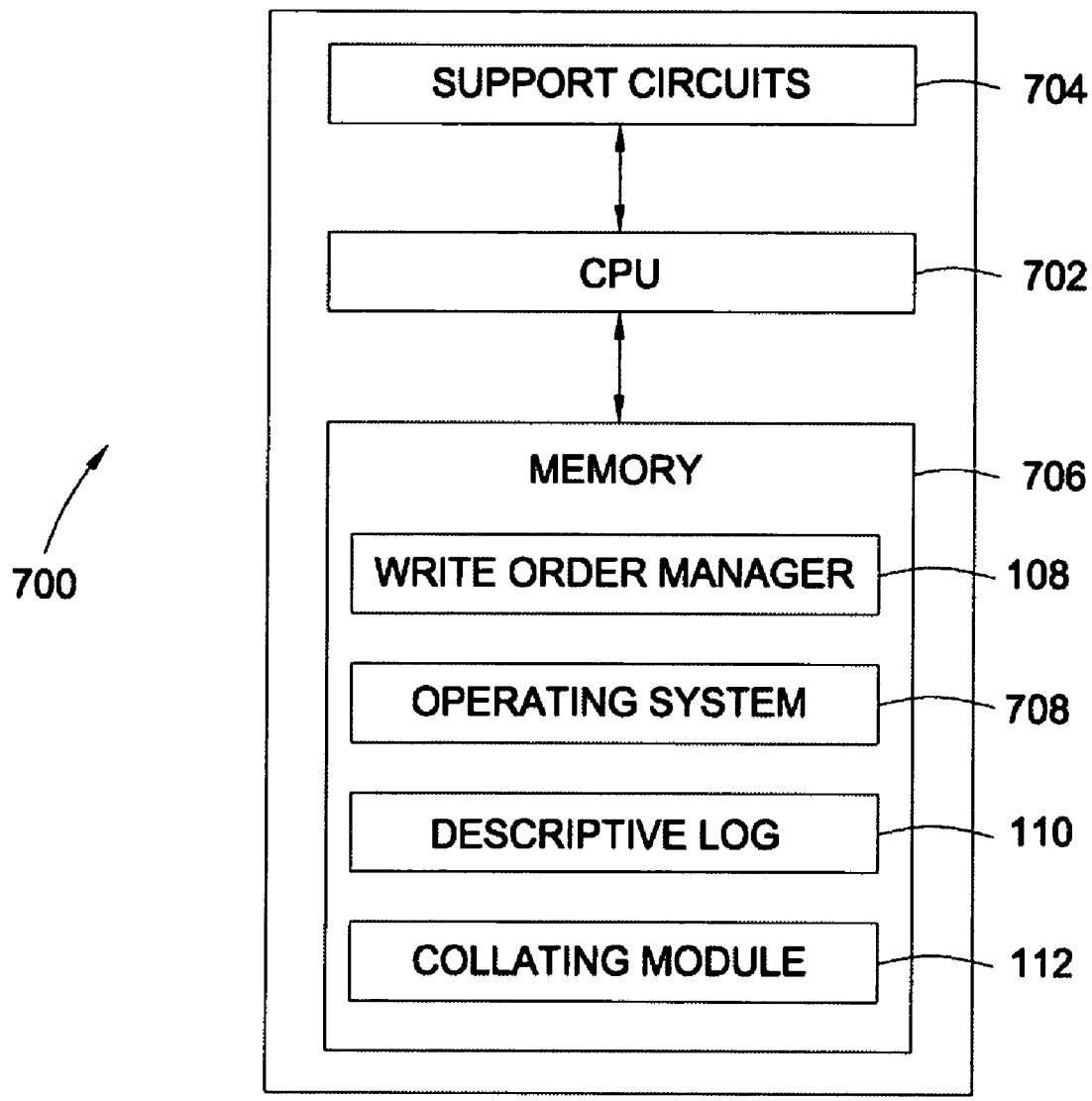
FIG. 7 a block diagram of an exemplary data processing device suitable for implementing various embodiments of the present invention.

FIG. 7 a block diagram of an exemplary data processing device 700 (e.g., appliance 116) suitable for implementing various embodiments of the present invention. Data processing device 700 comprises at least one central processing unit (CPU) 702, support circuits 704, and memory 706. CPU 702 comprises at least one microprocessor or microcontroller. Support circuits 704 are well-known circuits that support the operation of CPU 702 including but not limited to, power supplies, clocks, cache, input/output circuits, network cards, and the like. Memory 706 may include dynamic or static random access memory, magnetic or optical data storage disks, or magnetic data storage tapes, and the like. Other processing and memory means, including various computer readable media, may be used for storing and executing program instructions. Memory 706 comprises an operating system (OS) 708, write order manager 108, descriptor log 110 and collating module 112. OS 708 and other software may comprise various executable application modules. The teachings of the present invention may be embodied in the form of computer readable program code that is executable on data processing device 700.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

While the foregoing is directed to embodiments of the present invention, other and further embodiments of the invention may be devised without departing from the basic scope thereof, and the scope thereof is determined by the claims that follow.

The invention claimed is:

1. A method for maintaining the order of write-commands issued to a data storage, wherein the write-commands are issued by at least one host, the method comprising:
   assigning an order-descriptor to each write-command;
   storing the write-command;
   storing the order-descriptor; and
   collating a plurality of order-descriptors and their corresponding write-commands to obtain an ordered write-command stream;
   wherein assigning the order-descriptor to the write-command comprises:
      assigning an indicia of order to the write-command; and
      constructing the order-descriptor using the indicia of order and metadata information for the write-command.

2. The method of claim 1, wherein constructing the order-descriptor comprises:
   receiving the write-command from the host; and
   extracting the metadata information from the write-command; and
   placing at least some of the metadata information into the order-descriptor.

3. The method of claim 1, wherein constructing the order-descriptor comprises:
   receiving the metadata information from the host.

4. The method of claim 1 further comprising sending an acknowledgement message to the host.

5. The method of claim 1 further comprising updating a backup of the data storage using the ordered write-command stream.

6. The method of claim 1 further comprising rolling back the state of the data storage using the ordered write-command stream.

7. The method of claim 1, wherein the indicia of order comprises a time-stamp.

8. The method of claim 1, wherein the indicia of order comprises a monotonically increasing number.

9. The method of claim 1, wherein the metadata information comprises at least one of:
   an initiator of the write-command;
   a target volume of the write-command;
   a start-offset of the write-command;
   a length of the write-command; and
   location of the write-command in the data log.

10. A system for maintaining the order of write-commands issued to a data storage, wherein the write-commands are issued by at least one host, the system comprising:
    a write-order manager to assign an order-descriptor to each write-command;
    a data log associated with the issuing host to store the write-command;
    a descriptor log associated to write-order manager to store the order-descriptor; and
    a collating module to collate a plurality of order-descriptors from the descriptor log and their corresponding write-commands from the respective data logs to obtain an ordered write-command stream;
    wherein the write-order manager comprises:
       an ordering logic to assign an indicia of order to the write-command; and
       a descriptor generation logic to construct the order-descriptor using the indicia of order and a metadata information for the write-command.

11. The system of claim 10, wherein the descriptor generation logic comprises a metadata extractor to extract the metadata information of the write-command.

12. The system of claim 10, wherein the write-order manager comprises an acknowledgement logic to send an acknowledgement message to the host.

13. The system of claim 10 further comprising a backup system to store the ordered write-command stream.

14. A computer readable medium comprising a program that, when executed by a processor, performs a method for maintaining the order of write-commands issued to a data storage, wherein the write-commands are issued by at least one host, the method comprising:
    assigning an order-descriptor to each write-command;
    storing the write-command;
    storing the order-descriptor; and
    collating a plurality of order-descriptors and their corresponding write-commands to obtain an ordered write-command stream;
    wherein assigning the order-descriptor to a write-command comprises:
       assigning an indicia of order to the write-command; and
       constructing the order-descriptor using the indicia of order and metadata information for the write-command.

15. The computer readable medium of claim 14, wherein constructing the order-descriptor comprises:

receiving the write-command from the host; and extracting the metadata information from the write-command; and placing at least some of the metadata information into the order descriptor.

16. The computer readable medium of claim 14, wherein constructing the order-descriptor comprises:

receiving the metadata information from the host.

17. The computer readable medium of claim 14 further comprising updating a backup of the data storage using the ordered write-command stream.

* * * * *